(12) United States Patent
DiTomaso et al.

(10) Patent No.: US 10,169,314 B2
(45) Date of Patent: Jan. 1, 2019

(54) SYSTEM AND METHOD FOR MODIFYING WEB CONTENT

(71) Applicants: Joseph DiTomaso, New York, NY (US); William Beckler, New York, NY (US)

(72) Inventors: Joseph DiTomaso, New York, NY (US); William Beckler, New York, NY (US)

(*) Notice: Subject to any disclaimer, the term of this patent is extended or adjusted under 35 U.S.C. 154(b) by 26 days.

(21) Appl. No.: 15/271,705

(22) Filed: Sep. 21, 2016

(65) Prior Publication Data

US 2018/0081866 A1    Mar. 22, 2018

(51) Int. Cl.
| | |
|---|---|
| *G06F 17/21* | (2006.01) |
| *G06F 17/24* | (2006.01) |
| *G06F 17/30* | (2006.01) |
| *G06F 17/22* | (2006.01) |
| *H04L 29/08* | (2006.01) |

(52) U.S. Cl.
CPC ............ *G06F 17/24* (2013.01); *G06F 17/218* (2013.01); *G06F 17/2247* (2013.01); *H04L 67/02* (2013.01)

(58) Field of Classification Search
CPC .. G06F 17/211; G06F 17/248; G06F 17/2705; G06F 17/21; G06F 17/2294; G06F 17/243; G06F 17/28; G06F 17/30011; G06F 17/24; G06F 17/3089; G06F 17/30905; G06F 17/2235; G06F 17/27; G06F 17/30253
See application file for complete search history.

(56) References Cited

U.S. PATENT DOCUMENTS

| | | | | |
|---|---|---|---|---|
| 6,122,647 A | * | 9/2000 | Horowitz | G06F 17/30873 715/205 |
| 7,698,626 B2 | * | 4/2010 | Baluja | G06F 17/30873 715/205 |
| 2007/0088609 A1 | * | 4/2007 | Reller | G06Q 30/02 705/14.71 |
| 2008/0120154 A1 | * | 5/2008 | Dellovo | G06Q 10/0637 705/14.72 |
| 2013/0268839 A1 | * | 10/2013 | Lefebvre | G06F 17/21 715/234 |
| 2014/0108145 A1 | * | 4/2014 | Patel | G06Q 30/0256 705/14.54 |

(Continued)

OTHER PUBLICATIONS

Li, Lusong et al., "PageSense: Style-wise web page advertising." WWW (2010), pp. 1273-1276 (Year: 2010).*

*Primary Examiner* — Ariel Mercado
(74) *Attorney, Agent, or Firm* — Buckley, Maschoff & Talwalkar LLC (57) ABSTRACT

Provided are a system and method for modifying textual web content of a web page by adding supplemental textual web content from another web page. In one example, the method includes analyzing a body of digital text content from a web page and determining at least one keyword included within the body of the digital text content, matching the at least one keyword with supplemental web content from another web page previously auto-detected by the web server, modifying the body of digital text content by embedding supplemental digital text content from the supplemental web content within the body of the digital text content, and transmitting the supplemental digital text content to a computing device providing the web page.

20 Claims, 6 Drawing Sheets

(56) References Cited

U.S. PATENT DOCUMENTS

2014/0372415 A1* 12/2014 Fernandez-Ruiz .......................... G06F 17/30991
707/722
2015/0170072 A1* 6/2015 Grant ................... G06Q 10/067
705/7.36
2017/0315676 A1* 11/2017 You ....................... G06F 17/248

* cited by examiner

Incomplete auto-generated content template:

- Interested in visiting [attraction detected in content] in [city]? [Interesting fact about city] [city] has [accommodation type summary]. We've assembled a complete list of every place to stay in [city], with [accommodation type] in [upcoming month] starting from $[X]/night and prices [dropping/increasing] to $[Y]/night in [further out month]. ⌐ 310

Example template based upon information auto-detected from content on page and information stored in enrichment database:

- Interested in visiting Legoland in Windsor? Windsor is an ancient town most famous for Windsor castle, the largest and oldest occupied castle in the world. Windsor has dozens of hotels and 8 B&Bs. We've assembled a complete list of every place to stay in Windsor, with 4-star hotels in July starting from $177/night and prices dropping to $108/night in September. ⌐ 320

SYSTEM AND METHOD FOR MODIFYING WEB CONTENT

BACKGROUND

The World Wide Web is a rich environment that includes web pages, blogs, news, wikis, social networking sites, free research services, media types, and more. Web content is the reason that a person views a web page. That is, readers typically visit a web page based on the content included therein. Web content may include various forms such as text, animation, images, video, sound, and the like. Of these types of content, textual web content can be the least exciting because it is typically written words that have been converted to digital text, without the bells and whistles of images, sound, and video or animation. Therefore, textual web content can struggle to attract and attain readers for much longer than a few seconds before they move away from the page. Accordingly, before designing any given page, it may be beneficial to determine the primary goal of the page and to whom this page is targeted. For example, it can be helpful to determine keywords or phrases that a reader would most likely use to search for the web page. The best web content developers are those who can put themselves in the shoes of the reader and write as if they are having a one-on-one conversation with that reader.

In order to modify content from the web it is necessary to collect usable data. The first step in making usable data from the textual web content typically involves the harvesting of the actual data. In order to harvest textual web data, a server or user manually navigates to each page and stores all the text from the respective page and then archives it. However, navigating on a page-by-page basis in order to navigate through, download, and archive content can be a menial and onerous task.

SUMMARY

In one general aspects, provided is a web server for modifying web content, the web server including a processor configured to analyze a body of digital text content from a web page and determine at least one keyword included within the body of the digital text content, a matcher configured to match the at least one keyword with supplemental digital text content from another web page previously auto-detected by the web server, a modifier configured to modify the body of digital text content by embedding the supplemental digital text content within the body of the digital text content, and a network interface configured to provide the supplemental digital text content to a computing device providing the web page.

In another general aspect, provided is a computer-implemented method for modifying web content, the computer-implemented method including analyzing a body of digital text content from a web page and determining at least one keyword included within the body of the digital text content, matching the at least one keyword with supplemental digital text content from another web page previously auto-detected by the web server, modifying the body of digital text content by embedding the supplemental digital text content within the body of the digital text content, and transmitting the supplemental digital text content to a computing device providing the web page.

In another general aspect, provided is a non-transitory computer readable medium having stored therein instructions that when executed cause a computer to perform a method for modifying web content, the method including analyzing a body of digital text content from a web page and determining at least one keyword included within the body of the digital text content, matching the at least one keyword with supplemental digital text content from another web page previously auto-detected by the web server, modifying the body of digital text content by embedding the supplemental digital text content within the body of the digital text content, and transmitting the supplemental digital text content to a computing device providing the web page.

Other features and aspects may be apparent from the following detailed description, the drawings, and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Compelling online content is critical for attracting web visitors yet it can be difficult to create. One type of online content is textual web content which may be included in a web page, a blog, an online publication, and the like. Textual web content often includes a body of writing such as an article and may include digital text within the body that is composed of words, sentences, paragraphs, etc., and describing or discussing substantive content or topics. For example, the substance of the textual web content may be a news article, an editorial column, a blog, a sporting event recap, a debate, and the like. According to the example embodiments, provided is a system and method directed to modifying textual web content with supplemental content. For example, the textual web content may be from a first website and the supplemented textual web content may be from a second website that is different than the first web site thereby enhancing the original web content of the first website with textual content from the second website.

In the example embodiments, the supplemental content may be embedded within the original web content such that the original content remains. That is, the supplemental web content may be added to the web page without deleting any of the original web content. As a result, the substance of the original web content may be maintained from a beginning of a body of the content to an end of the body of the content with the supplemental web content added somewhere within. Accordingly, an attention of the reader may be maintained because the original content remains. Furthermore, the substance of the original web content may be improved or enhanced by the addition of content from another website because the supplemental textual web content may provide additional or alternative substance to the substance of the original textual web content. As a result, auto-detected content from a different website may be added to an article or other writing on a publisher website thereby transforming the article from the purpose of its original publication (e.g., news or opinion) to an article providing supplemental information such as travel information, financial information, entertainment information, and the like.

Figure 1:
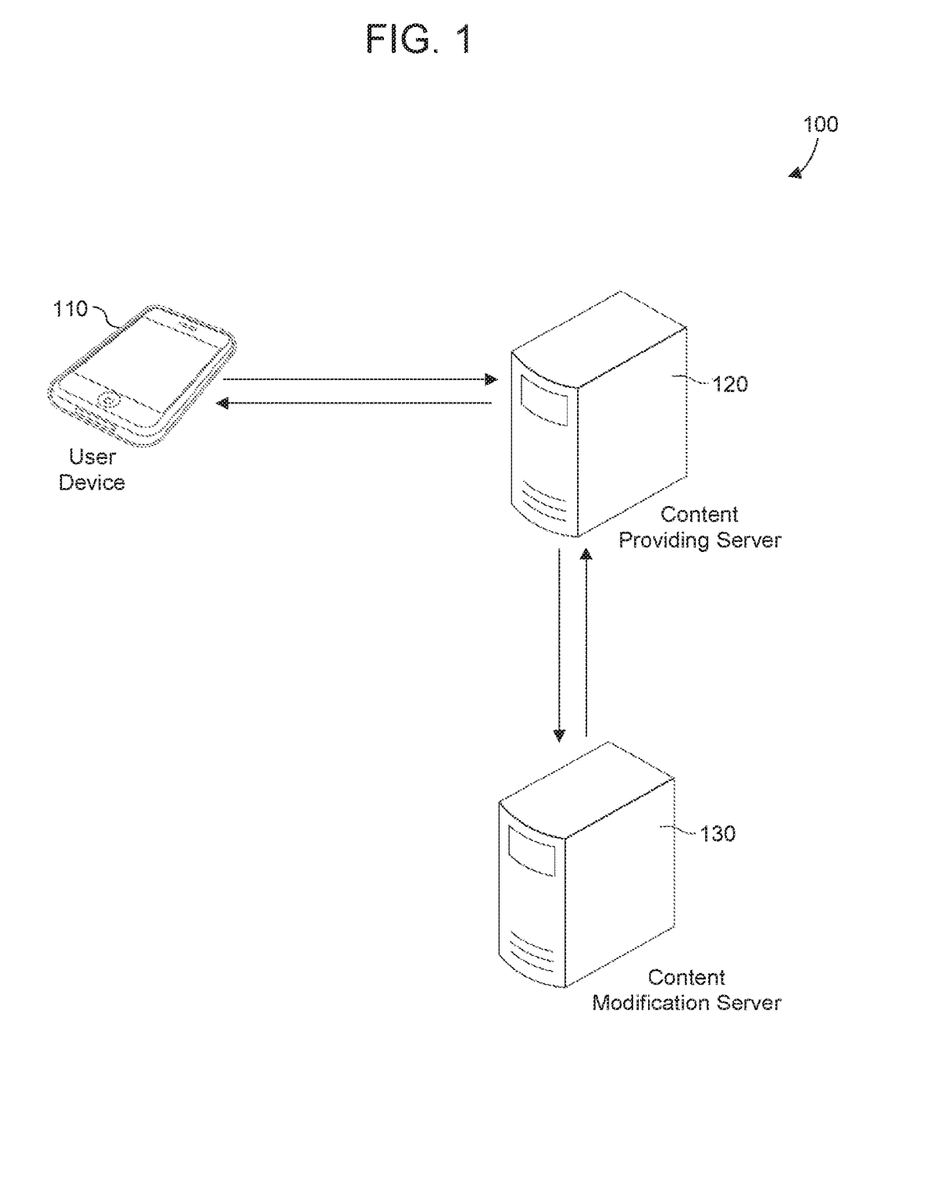
FIG. 1 is a diagram illustrating a system for modifying web content in accordance with an example embodiment.

FIG. 1 illustrates a system 100 for modifying web content in accordance with an example embodiment. Referring to FIG. 1, the system 100 includes a user device 110, a content providing server 120, and a content modification server 130. For example, the user device 110 and the content providing server 120 may be connect through a network such as the Internet, a cellular network, a private network, and/or the like. Likewise, the content providing server 120 may be connected to the content modification server 130 through the Internet, or other network. As another example, the content providing server 120 may be connected to the content modification server 130 through a wired back-end. As another example, the content providing server 120 and the content modification server 130 may be the same device or combination of devices. It should also be appreciated that the user device 110 may be connected to both the content providing server 120 and the content modification server 130.

In this example, the user device 110 may be a mobile device, a laptop, a tablet, a desktop computer, an appliance, a notepad, a smart wearable device, an appliance, a kiosk, and the like. The user device 110 may have installed therein a web browser such as MICROSOFT INTERNET EXPLORER, GOOGLE CHROME, APPLE SAFARI, MOZILLA FIREFOX, and the like. The user device 110 may run the web browser and a user thereof may input a web address of a website provided by or hosted by the content providing server 120. For example, the website may be a publication based website that publishes articles, such as a newspaper, magazine, periodical, blog, and the like. The user of the user device 110 may select a web page of the website provided by the content providing server 120. Here, the web page may have contained therein an article or other writing or story that the user desires to read. The web page may have a body of digital text content that makes up the article or other writing and it may include sentences, paragraphs, and the like, having a general structure. Although article is used to describe the writing herein for convenience, it should be appreciated that the article may be any other type of digital written content such as a story, blog, and the like.

Prior to receiving the request from the user device 110 to view the web page corresponding to the article, or in response to receiving the request from the user device 110 to view the web page corresponding to the article, the content providing server 120 may transmit the textual content of the article to the content modification server 130 and receive supplemental content from the content modification server 130 to use to supplement the textual web content of the article. Here, the content modification server 130 may modify the web page displaying the article by inserting additional supplemental content within a body of digital text included in the article. The supplemental content may be determined by the content modification server 130 based on keywords included within the body of digital text of the article. The content modification server 130 may insert a paragraph or a sentence into the body of the article based on the substance of the article or a particular word in the article.

For example, the article displayed in the web page may be about an event or may include a discussion of the event. The content modification server 130 may detect the event within the article as a keyword. Also, the content modification server 130 may determine a geographical location of the event based on information from the article or information pre-stored in the content modification server 130. In this example, the content modification server 130 may generate supplemental content based on the geographic location of the event such as hotel locations near the geographic location, travel information about flights, trains, buses, and the like to the geographic location, and the like. Furthermore, the content modification server 130 may generate a phrase, a sentence, a paragraph, etc., of supplemental digital text based on the matched supplemental content. In addition, the content modification server 130 may modify the article by adding the supplemental digital text within digital text of a body of the article. As one example, the supplemental digital text may be a sentence. In this case, the content modification server 130 may insert the sentence of supplemental digital text before and/or after an original sentence included in the article. As another example, the supplemental digital text may be a paragraph. In this example, the content modification server 130 may insert the paragraph of supplemental digital text before and/or after a paragraph included in the article. The content modification server 130 may provide the supplemental digital text to the content providing server along with a position for inserting the supplemental digital text within the body of the article to enable the content providing server 120 to modify the original article included in the web page hosted by the content providing server 120. Accordingly, the content modification server 130 may modify the digital text content of an article or other writing by adding additional digital text content within a body thereof.

According to various aspects, the content modification server 130 may be a web server that auto-detects supplemental content from various sources on the web such as websites, web pages, databases, and the like. In some examples, the detected supplemental content may be related to a particular industry or topic (e.g., travel, finance, entertainment, news, etc.) As a non-limiting example, the auto-detected supplemental content may be information related to traveling such as flight information, vacation home rental information, hotel information, and the like. As another example, the detected supplemental content may be financial related information, sports related information, activity related information, and the like. To auto-detect the supplemental content, the modification server 130 may perform a crawl of one or more web sources (e.g., web sites, databases, etc.) on a periodic basis, for example, daily, hourly, weekly, and the like, and store the supplemental content detected therefrom in a local database or an external database connected thereto.

When the content modification server 130 receives an article (or other writing) from the content providing server 120, the content modification server 130 may scan the article for keywords based on a list of keywords stored at the content modification server 130. In response to detecting a keyword within the article, the content modification server 130 may match the keyword to supplemental content that was previously auto-detected by the content modification server. Furthermore, the content modification server 130 may modify the article by inserting digital text from the matched supplemental content into the article. For example, the content modification server may generate supplemental digital text to add to the article based on a predefined template. The content modification server 130 may provide the supplemental digital text to the content providing server 120 and an indication of how the article is to be modified with the supplemental digital text. Accordingly, when the user device 110 receives the web page from the content providing server 120, the web page may include a modified article that is enhanced with supplemental content from the content modification server 130. As a result, a user of the user device 110 may read the article without being interrupted but while at the same time receiving supplemental information enhancing the digital text content of the article.

Figure 2:
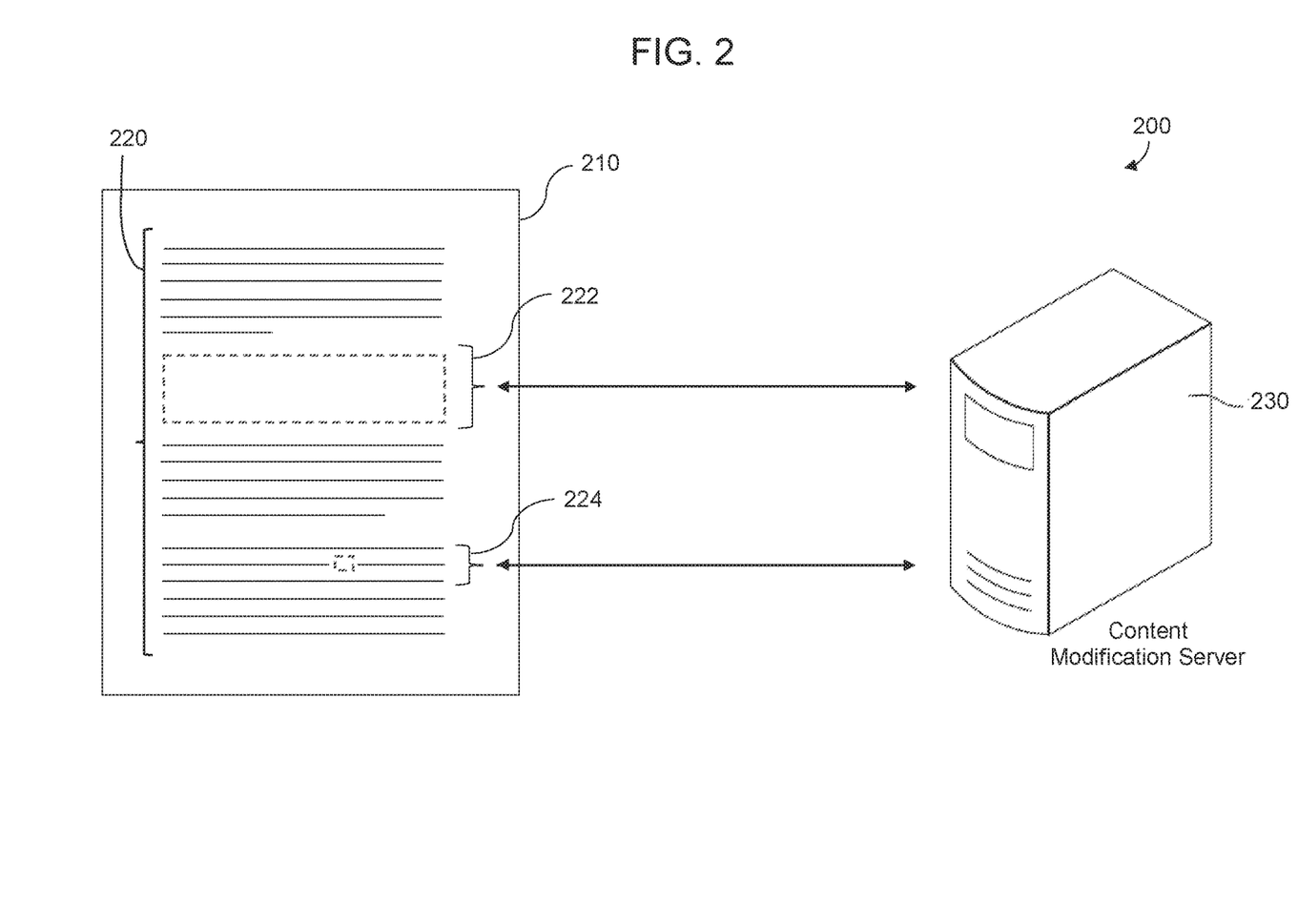
FIG. 2 is a diagram illustrating a process of providing textual web content from a web page to an external web server in accordance with an example embodiment.

FIG. 2 illustrates a process 200 of providing textual web content from a web page to an external web server in accordance with an example embodiment. Referring to FIG. 2, a web page 210 may be hosted by a web content provider such as the content providing server 120 shown in FIG. 1. In this example, the web page 210 corresponds to a writing such as an article and includes a body of digital text content 220 that has lines of words, sentences, and paragraphs. Embedded within the body of digital text content 220 is a first tag 222 and a second tag 224. For example, the first and second tags 222 and 224 may be Hypertext Markup Language (HTML) tags, JAVASCRIPT tags, and the like. In the example of FIG. 2, the first tag 222 corresponds to a paragraph of supplemental digital text content that is to be added and the second tag 224 corresponds to a phrase or sentence of supplemental digital text content that is to be added. Each tag 222 and 224 may provide the content included in the body of digital text content 220 to the content modification server 230. That is, the tags 222 and 224 may transmit the article to the content modification server 230.

In both cases, the content modification server 230 may analyze the article to identify at least one keyword included therein. The content modification server 230 may match an identified keyword to supplemental content previously auto-detected by the content modification server 230. Furthermore, the content modification server 230 may generate supplemental digital text to be inserted within the digital text content 220 of the article. In the case of tag 222, the content modification server 230 may generate a paragraph of supplemental digital text that is to be inserted into the body of the article (i.e., the body of digital text content 220) at a position of the tag 222, and transmit the paragraph of supplemental digital text to the tag 222. In response, the tag 222 may insert the paragraph of supplemental digital text within the body of the article at a position of the tag 222. In the case of tag 224, the content modification server 230 may generate a phrase of supplemental digital text (word or a few related words) or a sentence of supplemental digital text that is to be inserted into the body of the article at a position of the tag 224, and transmit the paragraph of supplemental digital text to the tag 224. In response, the tag 224 may insert the phrase or sentence of supplemental digital text within the body of the digital text content 220 at a position of the tag 224.

Figure 3:
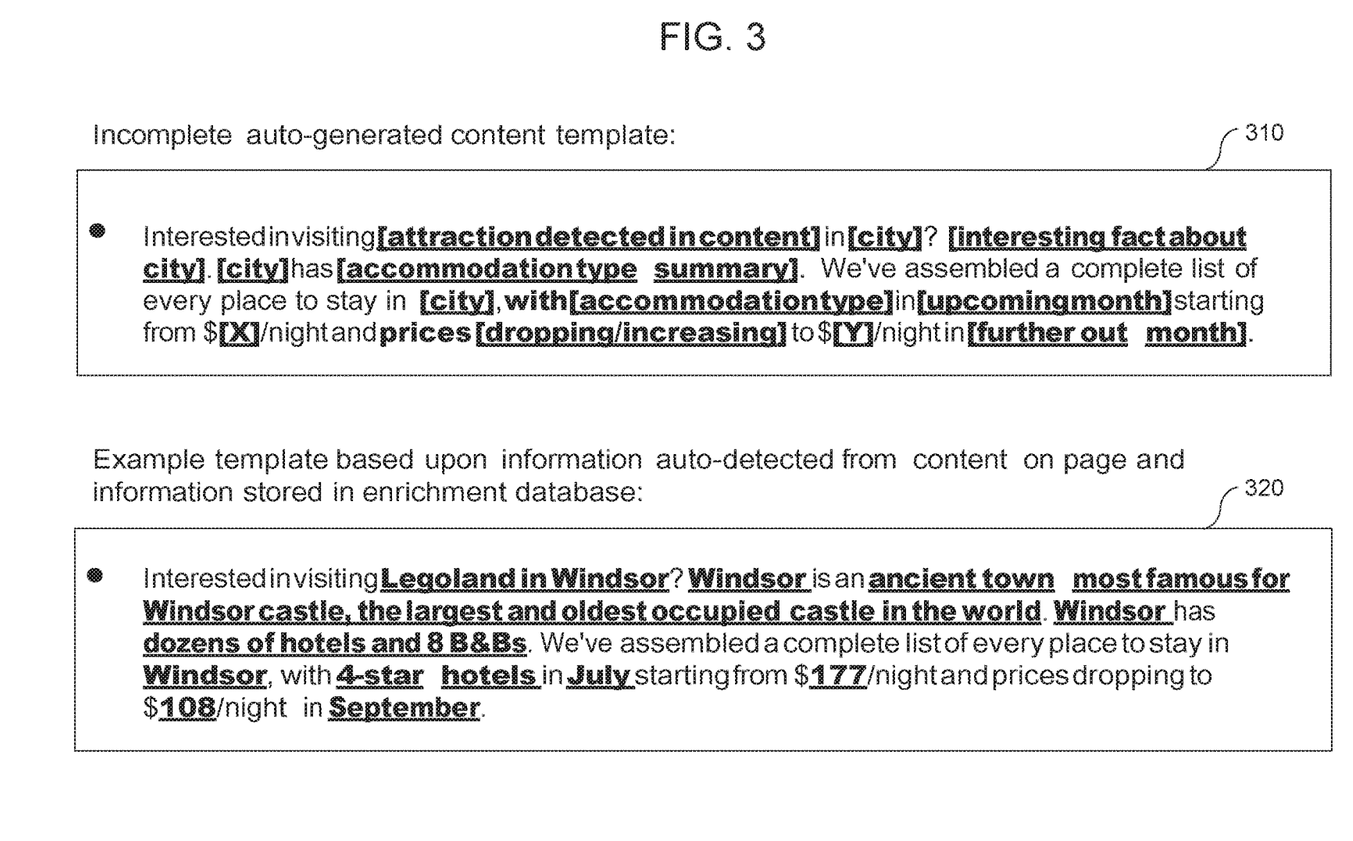
FIG. 3 is a diagram illustrating an auto-generated web content modification template in accordance with an example embodiment.
Figure 4:
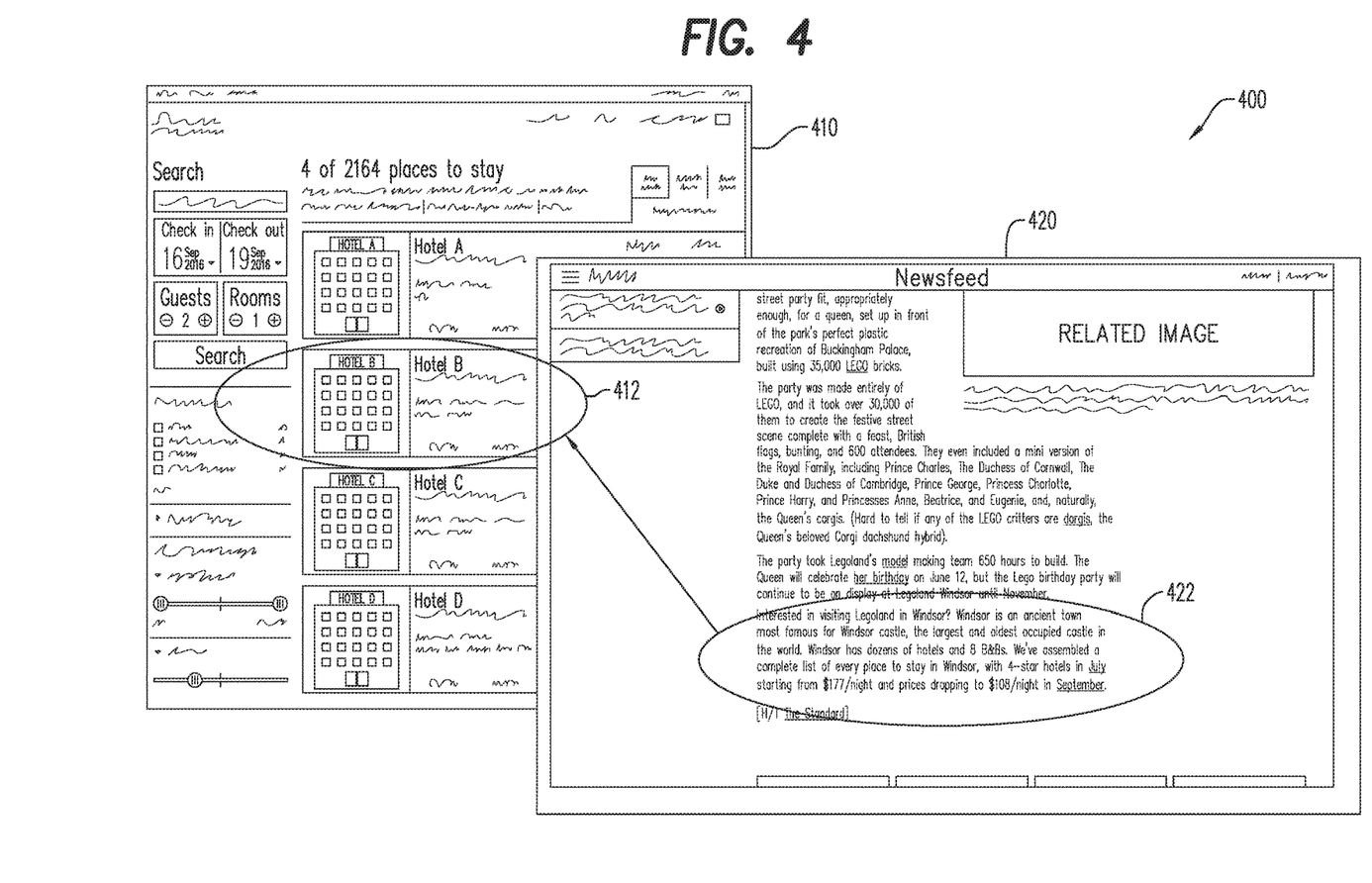
FIG. 4 is a diagram illustrating web content being modified in accordance with an example embodiment.

FIG. 3 illustrates an auto-generated web content modification template in accordance with an example embodiment, and FIG. 4 illustrates a body of digital text web content being modified by the auto-generated web content modification template of FIG. 3 in accordance with an example embodiment. In the example of FIG. 3, template 310 includes a plurality of fields into which supplemental digital text content may be incorporated or otherwise added. In this example, the template 310 has the form of a paragraph of digital text. A first field may receive a name of an attraction, for example, a site, an event, a place, and the like, and the second field may receive a name of a travel destination (e.g., a name of a city, state, country) corresponding to the attraction. The third field also receives the name of the travel destination and the fourth field receives an accommodation type located in the geographical location. The rest of the fields in the template 310 are related to pricing and dates for the accommodation. During processing, the content modification server may generate the completed template 320 shown in FIG. 3 having supplemental digital text inserted therein from another website. For example, the supplemental digital text may be extracted from a travel website and may be determined based on a keyword included within an article of a web page.

FIG. 4 illustrates an example of the completed template 320 from FIG. 3 being embedded as supplemental digital text content 422 into the body of an article displayed within web page 420 of FIG. 4. In this example, the content modification server (not shown) may receive the body of text content of the article from the web page 420 through a tag or a link embedded within the web page 420. The content modification server may scan the body of the digital text and identify one or more travel related keywords. In this example, the keyword is a city (e.g., a geographical destination) but it may be another type of keyword such as an event, an attraction, or the like. Prior to receiving the original content of the article from web page 420, the content modification server may perform a crawl on a periodic basis of various travel-related websites such as a website including web page 410 having a plurality of travel accommodations. By performing the periodic crawl, the content modification server may auto-detect travel accommodations from various websites at periodic intervals, extract the information, and store the travel accommodations within a local database or an external database connected thereto.

When the article is received from the tag embedded in the web page 420, the content modification server may match the geographical destination (i.e., the keyword) detected from the article from web page 420 with various accommodations corresponding to the geographical destination such as accommodations previously detected from web page 410. In this example, web page 410 may be a page of a different website than web page 420 corresponds to. The content modification server may extract supplemental digital content from a particular accommodation 412 shown on web page 410 (e.g., accommodation type, dates, pricing, rating, availability) and insert the supplemental digital content as digital text into the corresponding accommodation type field, pricing fields, and date fields within the template 310 to generate the completed template 320 (i.e., supplemental digital text content 422 in FIG. 4). Furthermore, the supplemental digital text content 422 may be added to the article shown in the web page 420. That is, the supplemental digital text content 422 may be embedded within the article and may have a format that matches the format of the article thereby maintaining the reader's attention without distracting the reader. That is, travel related content from web page 410 may be merged with non-travel related content included in web page 420 thereby creating an enhanced digital content in web page 420. In this case, the reader may be reading the article and continue reading over the travel related information embedded within the article and find such 12information to be useful.

According to various embodiments, incidentally related articles, or non-travel related articles, may be transformed into travel-related articles having actionable items (links) within the article allowing the reader of the article to select the travel-based information to inquire, book, and/or purchase travel accommodations such as vacation home rentals, flights, hotel rentals, and the like. A content modification server can receive an article (e.g., article hosted by a newspaper or social media website) from a tag embedded on a web page displaying the article which is in communication with the backend content modification server. The content modification server can scan the content of the article and send back a sentence or a paragraph of supplemental digital text to be inserted into the article. Within the paragraph may be embedded advertising/travel content based on keywords from within the article. The tag may be embedded on a content producer site or publisher site (Time Magazine, New York Times, Social Media site, etc.) and may transmit data about the article to a content modification server through a network such as the Internet. The modified article with travel related information embedded therein may be significantly more relevant than simple banner ads or digital pop-up ads because the editorial gets the consumer's attention in a more interesting way by modifying readable content from within without interrupting the reader with additional windows, pop-ups, or blocks of unwanted information.

Examples of types of keywords being scanned for within the article include destinations (e.g., specific words related to top travel destinations) and location based events mentioned by the article (e.g., future events such as parades, concerts, sporting events, entertainment events, and the like). For example, the destination keyword may be an actual geographical location or place that is mentioned in the article. In some examples, the article may include stop words or blocking content such as death, tragedy, terror, etc. When one of these words is detected by the content modification server, the content modification server may stop scanning the article and determine not to modify the content as a result. As another example, location based event keywords may be scanned and detected from the article and may include events that are pre-stored in a central database maintained by content modification server based on scanned event-related data from the World Wide Web and/or event data entered manually. The content modification server may compare the pre-stored events to the words in the article to determine if the article includes any of such events (i.e., keywords). In some cases, a user may have the ability to manually create events on an event page creation table. In this case, a user can login on the content modification server and create events through an event page product creator. For example, the user may input a start date, end date, address and location of event.

An article typically includes written content that may be published in a print or electronic medium corresponding to a newspaper, magazine, periodical, website, blog, and the like. An article may provide readers with information such as news, research results, analysis, debate, special interests, financial matters, entertainment, as well as many other topics. Information included in an article may be factual (e.g., news, technology, sports, interviews, statistics, or academic). As another example, information included in an article may be opinion based (e.g., editorials, journals, opinions, or the like). As the use of the Internet has grown there has been a trend in publishing articles online through news websites, special interest blogs, and other content forums. One of the biggest problems with reading online content, however, is dealing with the myriad of distractions created by advertisements within and around the online content such as hyperlinks, ads, hypertext, pop-ups, banner ads, and the like, which can distract a reader and take the reader away from the online content which they are trying to read, for example, if the reader accidentally clicks on a link or a pop-up. In some cases, the reader does not even need to make a selection and they are automatically taken away from the content of interest.

Given the frustrations of web visitors on current newspaper and magazine related websites, readers have recently begun migrating away from newspaper and magazine based websites and toward Facebook and other social media destinations. In turn, social media has become a target for advertisers. For a competitive price a social media site can provide an advertiser with access to a large group of people and even target specific groups of people, challenging the value of a publisher's channel. Furthermore, with readers becoming more wary of advertisements, publishers have been left to compete for advertising on different terms, leaning less on the size or demographics of their readerships, and more on campaigns they can engineer for advertisers such as campaigns that are used across the Internet such as digital advertisements. Another type of advertising campaign found on newspaper and magazine related websites is sponsored content or native advertising. In most cases, sponsored content means video. However, sponsored content is expensive to produce and difficult to do well. For example, sponsored content can often mislead a reader/viewer into selecting a link which takes them away from the article they are reading, and onto a website or advertisement they are not interested in. Sponsored content has also causes readers to grow wary of visiting publishing web sites. Therefore, what is needed is a way of providing relevant content (such as travel related content) that is of interest to a reader but that does not take away the reader's attention from online publications such as articles, blogs, and other writings.

According to the examples provided herein, an article (or other written work) that is online may be modified and enhanced based on one or more keywords within the article. For example, an article that mentions a destination such as a city, state, country, or the like, or an event such as a news related event, a sporting event, entertainment venue, and the like, may be modified based on various supplemental web content previously auto-detected by a web server. For example, the original content may be modified such that supplemental web content from another website (e.g., sights, attractions, vacation rental information, flight information, and the like) is embedded within the original content.

Because the reader is navigating to the original content (i.e., the article) that originally includes information about the destination or event, there is also a good chance the reader may be interested in visiting the destination or event. Therefore, providing the reader with travel information about the destination or event may be of significant interest to the reader. Furthermore, the article itself may be enhanced with the additional content without interrupting the flow of the article or distracting the reader's attention because the additional information may be embedded within sentences and/or paragraphs of the article.

A tag such as an embedded JAVASCRIPT tag, HTML tag, or the like, may be embedded within the article and may transmit information to a content modification server. For example, the tag may transmit the article itself to the content modification server. In response, the content modification server may analyze the article for any predefined keywords, for example, destinations, events, people, and the like. In response to finding a keyword, the web server may generate additional content that enriches the article such as travel related information, hotel information nearby, flight information, and the like. The format of the additional content may have the same structure and format of the article. For example, the additional content may be a paragraph, a sentence, or a partial sentence that is embedded within the original article. For example, the additional content may be embedded within the article at a location of the tag. By embedding the additional content within the article without modifying the structure or overall appearance of the article, the reader may see the additional content without being distracted by advertisements, pop-ups, banner ads, or the like.

Figure 5:
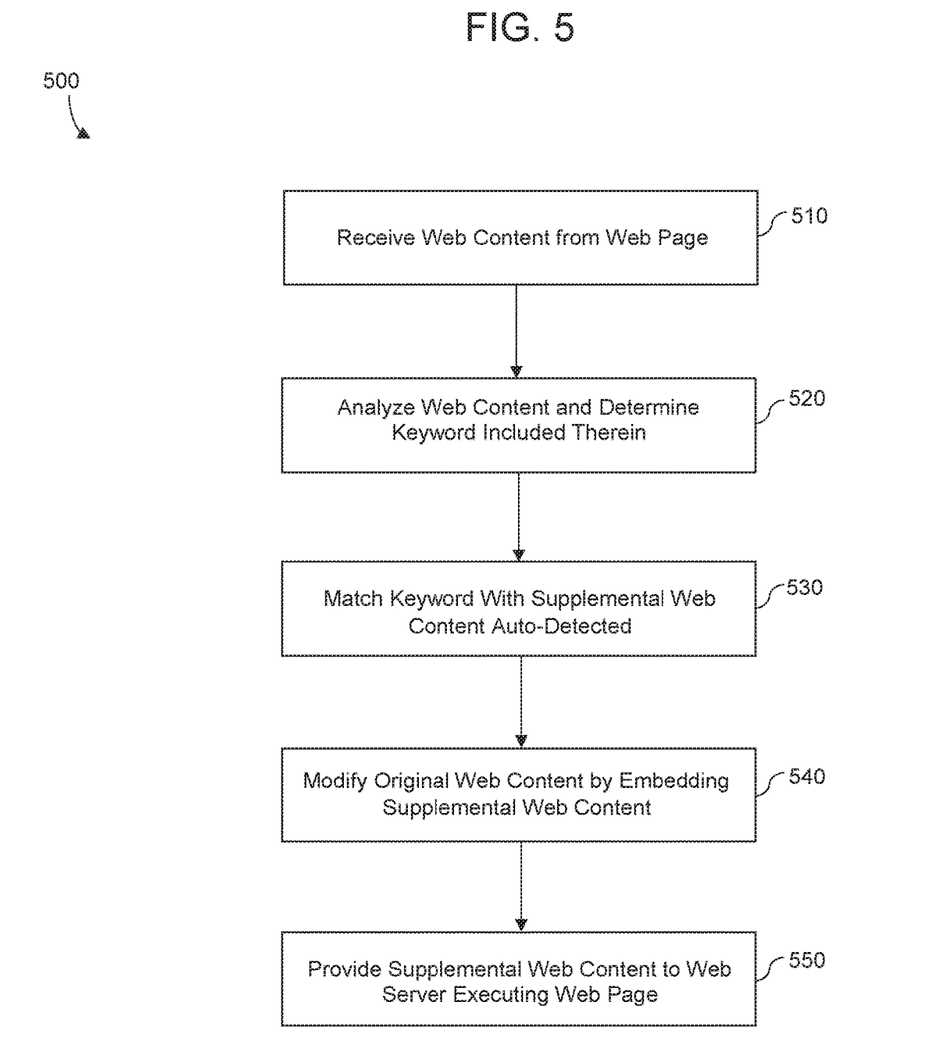
FIG. 5 is a diagram illustrating a method of modifying web content in accordance with an example embodiment.

FIG. 5 illustrates a method 500 of modifying web content in accordance with an example embodiment. For example, the method 500 may be performed by the content modification server 130 shown in FIG. 1, the content modification server 230 shown in FIG. 2, or another device. Referring to FIG. 5, the method includes receiving web content from a web page, in 510. For example, the web content may be received from an HTML tag, a JAVASCRIPT tag, a link, and the like, embedded on the web page. The web content may include textual content having a body of digital text such as an article, an editorial, a blog, or other digital text composed of words, sentences, paragraphs, and/or the like. In 520, the method includes analyze the digital text content and determining at least one keyword included within the digital text. As a non-limiting example, the keyword may include a geographical destination, an event, and the like.

According to various embodiments, the content modification server performing the method 500 may be a web server that auto-detects, extracts, and stores content from around the World Wide Web. For example, the web server may auto-detect vacation travel information from a plurality of travel-related websites on the web such as vacation rental web sites, hotel rental web sites, flight web sites, and the like, including vacation rental housing accommodations, sight-seeing information, attraction information, flight information, and the like. Accordingly, in 530, the method further includes matching the keyword detected in 520 with previously auto-detected content extracted and stored by the web server. For example, the keyword may be a geographical destination such as the name of a city, and the matched supplemental content may be information about travel accommodations located near the city. As another example, the keyword may be an event, and the content modification server may match the event to a city where the event is taking place. Accordingly, the matched supplemental content may be information about travel accommodations located near the city or the event.

In 540, the method includes modifying the original web content received from the web page with supplemental web content from the previously auto-detected content. For example, the modifying may include embedding supplemental digital text (e.g., words, phrases, sentences, paragraphs) within a body of the digital text of the original web content. Furthermore, the modifying may leave the entire original content without deleting or obscuring any of it. As a result, the original web content may keep the interest of the user while the supplemental added content may further enhance the user's reading experience. Furthermore, in 550, the method includes providing the matched supplemental web content for modifying the original web content to a web server hosting the web page providing the original web content. Accordingly, the web server can insert the supplemental digital text included in the supplemental web content into the original web content. For example, the web server may insert supplemental sentences or paragraphs of enhanced content within the body of a news article, editorial column, blog, and the like.

As one example, the supplemental digital text content may include a supplemental paragraph of digital text, and the modifying may include embedding the supplemental paragraph of digital text after a paragraph of digital text included in the body of the digital text content. As another example, the modifying may include embedding the supplemental paragraph of digital text between two paragraphs of digital text included in the body of the digital text content. In various examples, the supplemental digital text content may be generated based on a pre-defined template that includes content extracted from the body of digital text content of the original web page and content extracted from the supplemental digital text content previously auto-detected from another web page by the web server.

Figure 6:
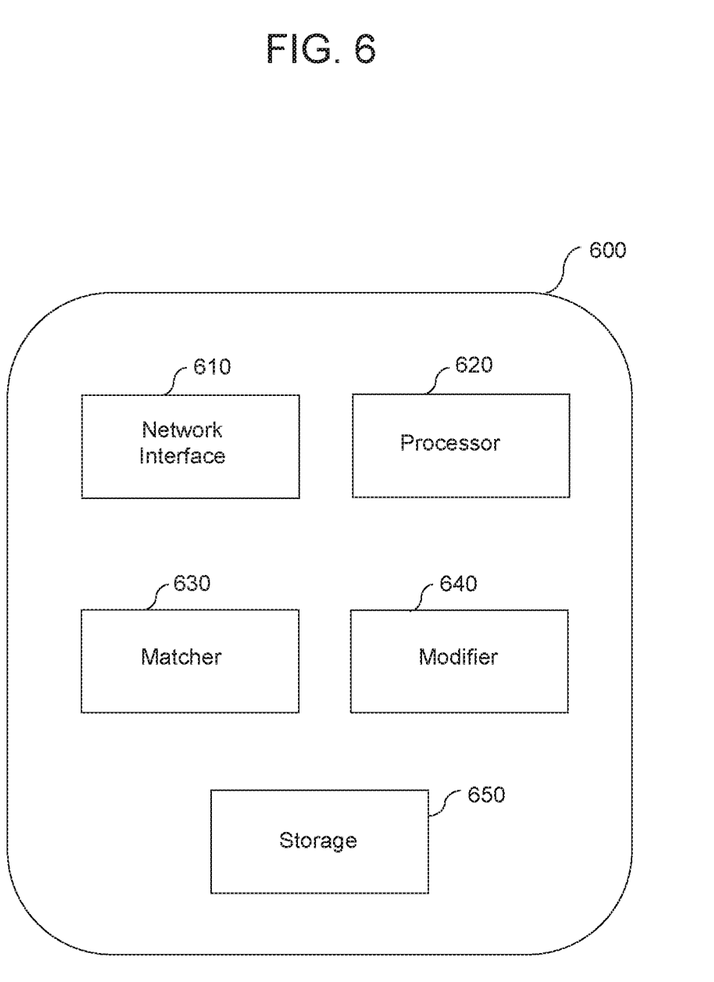
FIG. 6 is a diagram illustrating a web server for modifying web content in accordance with an example embodiment.

FIG. 6 illustrates a web server 600 for modifying web content in accordance with an example embodiment. For example, the web server 600 may be the content modification server 130 shown in FIG. 1, the content modification server 230 shown in FIG. 2, or the like, and may perform the method 500 shown in FIG. 5. Referring to FIG. 6, the web server 600 includes a network interface 610, a processor 620, a matcher 630, a modifier 640, and a storage 650. The processor 620 may control or may function as any one of the matcher 630 and the modifier 640. Also, the processor 620 may control the overall operations of the web server 600, and may include one or more processing devices having a single core, multicore, and the like. According to various embodiments, the web server 600 may be a computing device or group of devices that crawls various websites on a periodic or regular basis and extracts web content therefrom. For example, the processor 620 may detect the content and extract it from the various web sites and store the content as supplemental web content in the storage 650. According to various example embodiments, the web server 600 may modify web content from a first web page from a first website with supplemental web content from a second web page from a second website that is previously auto-detected by the web server 600.

For example, the network interface 610 may receive a body of digital text content from at least one of a HTML tag, a JAVASCRIPT tag, a link, or the like, embedded in the first web page. The body of digital text content may include an article, column, blog, or other writing having lines of text including one or more of words, sentences, and paragraphs. The processor 620 may analyze the body of digital text content received from the first web page and determine at least one keyword included within the body of the digital text content. As a non-limiting example, the at least one keyword may include a geographical location, an event, and the like. The matcher 630 may match the at least one keyword with supplemental web content from another web page previously auto-detected by the web server 600. The modifier 640 may modify the body of digital text content by embedding supplemental digital text content from the supplemental web content within the body of the digital text content. As an example, the embedded supplemental digital text content may include travel information about a geographical location detected from the body of the digital text content. In addition, the network interface 610 may provide the supplemental digital text content to a computing device controlling, hosting, executing, or otherwise providing the web page.

For example, the supplemental digital text content may include a supplemental paragraph of digital text. According to various embodiments, and the modifier 640 may modify the body of digital text content by embedding the supplemental paragraph of digital text after a paragraph of digital text included in the body of the digital text content or between two paragraphs of digital text included in the body of the digital text content. The modifier 640 may generate the supplemental digital text content based on a pre-defined template that includes content extracted from the body of digital text content and content extracted from the supplemental digital text content previously auto-detected by the web server.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM).

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the invention as set forth in the appended claims.

What is claimed is:

1. A web server for modifying web content, comprising:
a network interface configured to receive, via a network,
   a body of existing digital text web content from a tag that is embedded within and hosted by a web page having the body of digital text stored therein; and
a processor configured to
   identify at least one keyword included within the body of the existing digital text,
   determine supplemental digital text web content from a web page of a different website having content to add to the body of the existing digital text web content based on the identified at least one keyword, and
   generate additional text to add to the body of the existing digital text web content, the generating comprising retrieving a string of additional words which include empty data fields interspersed therein, and filling-in the empty data fields with auto-detected keywords from the supplemental digital text web content of the web page of the different website to generate a filled-in string of words that comprises a description based on a position between the beginning and the end of the body of the existing digital text web content where the filled-in string of words are to be embedded,
wherein the network interface is further configured to transmit the filled-in string of words to the tag embedded within and hosted by the web page thereby integrating the filled-in string of words into the body of the existing digital text stored within the web page without removing text content from the body of the existing digital text web content.

2. The web server of claim 1, wherein the filled-in string of words comprises a supplemental paragraph of digital text, and the processor is configured to control the network interface to transmit the supplemental paragraph to the tag which is embedded within the web page after a paragraph of digital text included in the body of the digital text content stored within the web page.

3. The web server of claim 1, wherein the filled-in string of words comprises a supplemental paragraph of digital text, and the processor is configured to control the network interface to transmit the supplemental paragraph to the tag which is embedded within the web page between two paragraphs of digital text included in the body of the digital text content stored within the web page.

4. The web server of claim 1, wherein the string of additional words with the empty data fields comprises a template that determines positions for text content extracted from the body of digital text content, determines positions for text content extracted from the supplemental digital text web content, and determines positions for the additional text to be inserted.

5. The web server of claim 1, wherein the at least one keyword comprises a name of a geographical location, and the supplemental digital text content comprises travel information about an entity located within the geographical location.

6. The web server of claim 1, wherein the at least one keyword comprises a name of a future event, and the supplemental digital text content comprises travel information about an entity at a geographical location at which the future event is going to take place.

7. The web server of claim 1, wherein the filled-in string of words comprises additional text around and between digital text from the supplemental digital text content to generate at least one of a sentence and a paragraph to be inserted into the body of digital text web content.

8. The web server of claim 1, wherein the tag is embedded at a position within the body of the digital text, and the processor combines the additional text and the supplemental digital text into a sentence structure that corresponds to the position within an article included in the body of the digital text.

9. A computer-implemented method for modifying web content, the computer-implemented method comprising:
   receiving a body of existing digital text web content from a tag that is embedded within and hosted by a web page having the body of digital text stored therein;
   identifying at least one keyword included within the body of the existing digital text content;
   determining supplemental digital text web content from a web page of a different website having content to add to the body of the existing digital text web content based on the identified at least one keyword;
   generating additional text to add to the body of the existing digital text web content, the generating comprising retrieving a string of additional words which include empty data fields interspersed therein, and filling-in the empty data fields with auto-detected keywords from the supplemental digital text web content of the web page of the different website to generate a filled-in string of words that comprises a description based on a position between the beginning and the end of the body of the existing digital text web content where the filled-in string of words are to be embedded; and
   transmitting the filled-in string of words to the tag embedded within and hosted by the web page thereby integrating the filled-in string of words into the existing body of digital text stored within the web page without removing text content from the body of the existing digital text web content.

10. The computer-implemented method of claim 9, wherein the filled-in string of words comprises a supplemental paragraph of digital text, and the transmitting comprises transmitting the supplemental paragraph to the tag which is embedded within the web page after a paragraph of digital text included in the body of the digital text content stored within the web page.

11. The computer-implemented method of claim 9, wherein the filled-in string of words comprises a supplemental paragraph of digital text, and the transmitting comprises transmitting the supplemental paragraph to the tag which is embedded within the web page between two paragraphs of digital text included in the body of the digital text content stored within the web page.

12. The computer-implemented method of claim 9, wherein the string of additional words with the empty data fields comprises a template that determines positions for text content extracted from the body of digital text content, determines positions for text content extracted from the supplemental digital text web content, and determines positions for the additional text to be inserted.

13. The computer-implemented method of claim 9, wherein the at least one keyword comprises a name of a geographical location, and the supplemental digital text content comprises travel information about an entity located within the geographical location.

14. The computer-implemented method of claim 9, wherein the at least one keyword comprises a name of a future event, and the supplemental digital text content comprises travel information about an entity at a geographical location at which the future event is going to take place.

15. A non-transitory computer readable medium having stored therein instructions that when executed cause a computer to perform a method for modifying web content, the method comprising:
   receiving a body of existing digital text web content from a tag that is embedded within and hosted by a web page having the body of digital text stored therein;
   identifying at least one keyword included within the body of the existing digital text content;
   determining supplemental digital text web content from a web page of a different website having content to add to the body of the existing digital text web content based on the identified at least one keyword;
   generating additional text to add to the body of the existing digital text web content, the generating comprising retrieving a string of additional words which include empty data fields interspersed therein, and filling-in the empty data fields with auto-detected keywords from the supplemental digital text web content of the web page of the different website to generate a filled-in string of words that comprises a description based on a position between the beginning and the end of the body of the existing digital text web content where the filled-in string of words are to be embedded; and
   transmitting the filled-in string of words to the tag embedded within and hosted by the web page thereby integrating the filled-in string of words into the existing body of digital text stored within the web page without removing text content from the body of the existing digital text web content.

16. The non-transitory computer readable medium of claim 15, wherein the filled-in string of words comprises a supplemental paragraph of digital text, and the transmitting comprises transmitting the supplemental paragraph to the tag which is embedded within the web page after a paragraph of digital text included in the body of the digital text content stored within the web page.

17. The non-transitory computer readable medium of claim 15, wherein the filled-in string of words comprises a supplemental paragraph of digital text, and the transmitting comprises transmitting the supplemental paragraph to the tag which is embedded within the web page between two paragraphs of digital text included in the body of the digital text content stored within the web page.

18. The non-transitory computer readable medium of claim 15, wherein the string of additional words with the empty data fields comprises a template that determines positions for text content extracted from the body of digital text content, determines positions for text content extracted from the supplemental digital text web content, and determines positions for the additional text to be inserted.

19. The non-transitory computer readable medium of claim 15, wherein the at least one keyword comprises a name of a geographical location, and the supplemental digital text content comprises travel information about an entity located within the geographical location.

20. The non-transitory computer readable medium of claim 15, wherein the at least one keyword comprises a name of a future event, and the supplemental digital text content comprises travel information about an entity at a geographical location at which the future event is going to take place.

* * * * *